No. 776,168. PATENTED NOV. 29, 1904.
B. BLOOD.
CHEESE CUTTER.
APPLICATION FILED MAR. 9, 1904.
NO MODEL.
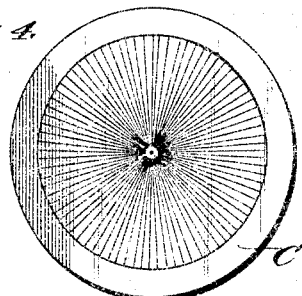
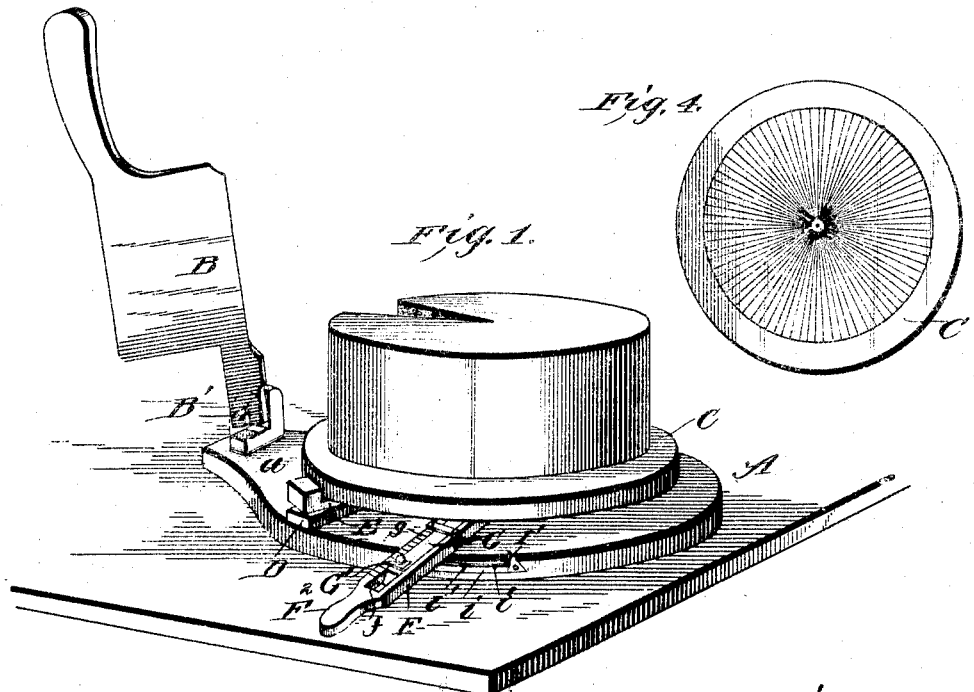
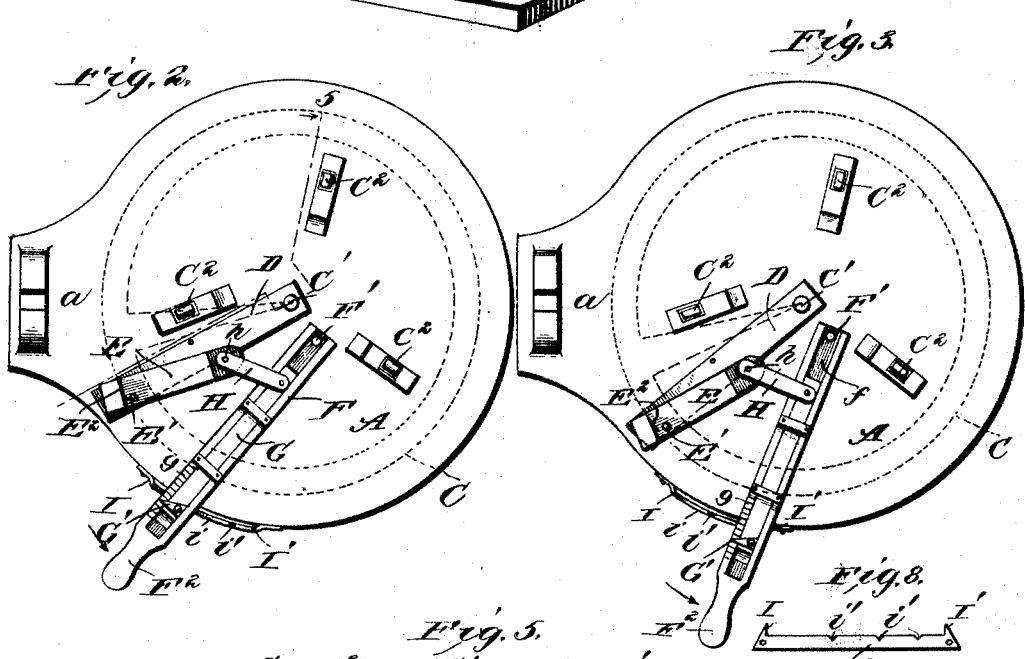
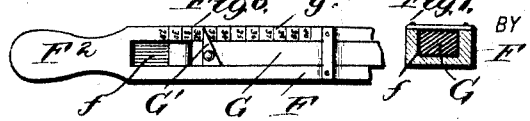
WITNESSES:
INVENTOR
Burr Blood.
BY Munn & Co.
ATTORNEYS No. 776,168. Patented November 29, 1904.

UNITED STATES PATENT OFFICE.

BURR BLOOD, OF COEUR D'ALENE, IDAHO.

CHEESE-CUTTER.

SPECIFICATION forming part of Letters Patent No. 776,168, dated November 29, 1904.

Application filed March 9, 1904. Serial No. 197,239. (No model.)

*To all whom it may concern:*

Be it known that I, BURR BLOOD, a citizen of the United States, and a resident of Coeur d'Alene, in the county of Kootenai and State of Idaho, have made certain new and useful Improvements in Cheese-Cutters, of which the following is a specification.

My invention is an improvement in cheese-cutters, seeking to provide a novel construction whereby to indicate the amount of cheese to be cut to secure a slice of any desired weight; and the invention consists in certain novel constructions and combinations of parts, as will be hereinafter described and claimed.

In the drawings, Figure 1 is a perspective view of a cheese-cutter embodying my invention. Fig. 2 is a top plan view of the base with the cheese-moving devices in place and the operating-lever in the position it occupies at the beginning of a stroke. Fig. 3 is a similar view with the operating-lever in the position it occupies at the end of a stroke. Fig. 4 is a detail top plan view of the cheese-plate or plate for supporting the cheese. Fig. 5 is a detail cross-section of the device on line 5 5 of Fig. 2. Fig. 6 is a partial top plan view, and Fig. 7 a cross-section, of the operating-lever with the slide in place; and Fig. 8 is a detail view of the stop-plate for limiting the movements of the operating-lever.

In the construction shown my device includes a base A, to which is pivoted at B' the blade B. As shown, the blade B is pivoted to a lateral supporting portion $a$ of the base A, so such blade may be tilted out of the way to permit the application of a cover to inclose the cheese. The device also includes the cheese-plate C for supporting the cheese, said plate being pivoted on the pin C', mounted on the base A, the swinging arm D, pivoted at its inner end on the pin C, the rocking dog E, pivoted to the arm D and forming a clutch engaged with the cheese-plate, the operating-lever F, pivoted at its inner end at F' and having at its outer end a handle at $F^3$, whereby it may be swung, a slide G, movable longitudinally along the lever F, a link H, connecting said slide with the rocking-dog E, whereby to operate said dog and through the dog to swing the arm D in the manner presently described, and stops I and I' to limit the movements of the operating-lever in both directions.

The cheese is supported on the plate C, which latter turns on the pivot C', and motion is given to the plate C to move the cheese by the swinging of the arm D, the latter being clutched to the cheese-plate by the dog E. This dog E is pivoted at E' on the arm D, has at its outer end a shoulder at $E^2$, lapping alongside the plate C and arranged to bind the same when the arm D is moved from left to right, (see Figs. 2 and 3,) the inner arm of the dog being extended to form a comparatively long arm with which the link H is connected at $h$, as shown in Figs. 2 and 3. The operating-lever F moves between the stops I and I', and when said lever F is in the position shown in Fig. 3 and is moved to the left its first action is to release the shoulder $E^2$ from engagement with the plate C, so the movement of the lever F from the position shown in Fig. 3 to that shown in Fig. 2 will not operate the cheese-plate C. In other words, when the operating-lever is moved from right to left it does not effect any operation or movement of the cheese-plate, while the movement of the said lever F from its position as shown at the left in Fig. 2 to the position shown at the right will operate to turn the disk C a distance corresponding to the length of movement of the lever F. In other words, when the lever F is moved in one direction it operates the plate C, while its movement in the reverse direction does not operate the said plate, the clutch binding the plate C in one direction and being freed from said plate when moved in the other direction, as will be understood from Figs. 2 and 3 of the drawings.

To vary the extent of movement of the arm D with the same movement of the lever F, I provide a slide G, movable along the lever F and forming a shifting connection between the link H and the said operating-lever. As shown, the slide G is a bar seated in a longitudinal groove $f$ in the upper face of the lever F, said bar G being provided with a pointer G', registering along graduations $g$ on the lever F and denoting the total number of pounds in the cheese placed upon the plate C. It will be noticed that the cheeses range in weight from forty to twenty-nine pounds, the heavier indications appearing toward the inner end of the operating-lever and ranging thence outward toward its outer end.

The stops I and I' are shown as provided on a plate $i$, which latter may be provided between the stops I and I' with notches or marks at $i'$ to indicate the movement of the operating-lever to measure fractions of a pound.

By means of the shifting connection it will be noticed that when the said shifting connection G is in its innermost position the arm D will be given a certain movement by the full movement of the lever F, while if the slide G be moved outward toward the outer end of the lever F the movement of said lever to the same extent as before will effect a greater movement of the swinging arm, according to the extent to which the said slide G is moved along the operating-lever.

In practice the plate C may be supported by rollers $C^2$ from the base, as shown in Figs. 2, 3, and 5, if desired.

In operation if the lever F be in the position shown in Fig. 2 and it is desired to cut from a cheese weighing, say, thirty-two pounds (see Figs. 2 and 6) a slice of cheese weighing one pound a cut may be made through the cheese, the knife raised, and the lever F be then moved to the right from the position shown in Fig. 2 to that shown in Fig. 3, when the cheese will have been moved from the initial cut an extent necessary to provide a slice weighing one pound, and the slices may be cut successively from the cheese of any desired weight by moving the cheese-plate a distance corresponding to the weight of slice desired.

Having thus described my invention, what I claim as new, and desire to secure by Letters Patent, is—

1. The improvement in cheese-cutters herein described comprising a base, an operating-lever pivoted to the base, a cheese-plate turning on the base, a swinging arm having a rocking dog forming a clutch to engage with the cheese-plate, a slide movable along the operating-lever and forming a shifting connection for a link, a link connecting said slide with the rocking dog, and stop devices on the base to limit the movement of the operating-lever in both directions substantially as set forth.

2. The combination in a cheese-cutter of a base, a cheese-plate, a clutch to engage the cheese-plate, a movable carrier for said clutch, an operating-lever, a link connected with the clutch, and a shifting connection between said link and the operating-lever substantially as set forth.

3. The combination in a cheese-cutter of a movable cheese-plate, a clutch to engage said cheese-plate, a movable carrier for said clutch, an operating-lever, a slide movable along the operating-lever, and a link connecting said slide with the clutch substantially as set forth.

4. The combination of the base, a rocking arm pivoted to the base, a cheese-plate pivoted to the base, a rocking dog pivoted to the arm and provided with means for engagement with the cheese-plate, the operating-lever, a link connected at one end with the rocking dog, and a shifting connection between said link and the operating-lever substantially as set forth.

5. The combination in a cheese-cutter of a swinging arm, a dog jointed thereto, an operating-lever and connections between the operating-lever and the dog substantially as set forth.

6. The combination in a cheese-cutter of a swinging arm, a clutch device thereon to engage with the cheese-plate, an operating-lever, and connecting devices between the operating-lever and the clutch devices on the swinging arm substantially as set forth.

7. The combination of the operating-lever having graduations corresponding to the total weight of the cheese, a slide movable along said lever and registering with graduations thereon, the swinging arm, a rocking dog thereon to engage with a cheese-plate, and connections between said dog and the slide of the operating-lever substantially as set forth.

8. The combination in a cheese-cutter of a swinging arm, a dog pivoted to said arm and forming a clutch to engage with a cheese-plate and having a portion projecting inwardly from its pivot toward the pivotal center of such cheese-plate, and means connected with said inwardly-projecting portion whereby said dog may be operated.

BURR BLOOD.

Witnesses:
FRED L. BURGAN,
JAMES L. McCLEAR.